United States Patent
Östby (10) Patent No.: US 9,992,455 B2
(45) Date of Patent: Jun. 5, 2018

(54) VIDEO ENCODING METHOD AND VIDEO ENCODER SYSTEM

(71) Applicant: AXIS AB, Lund (SE)

(72) Inventor: Björn Östby, Lund (SE)

(73) Assignee: Axis AB, Lund (SE)

( * ) Notice: Subject to any disclaimer, the term of this patent is extended or adjusted under 35 U.S.C. 154(b) by 295 days.

(21) Appl. No.: 14/887,964

(22) Filed: Oct. 20, 2015

(65) Prior Publication Data

US 2016/0119588 A1    Apr. 28, 2016

(30) Foreign Application Priority Data

Oct. 22, 2014  (EP) ..................................... 14189913

(51) Int. Cl.
| | |
|---|---|
| H04N 7/18 | (2006.01) |
| H04N 19/172 | (2014.01) |
| H04N 19/114 | (2014.01) |
| H04N 19/124 | (2014.01) |
| H04N 19/136 | (2014.01) |

(Continued)

(52) U.S. Cl.
CPC ............ *H04N 7/183* (2013.01); *H04N 19/107* (2014.11); *H04N 19/114* (2014.11); *H04N 19/124* (2014.11); *H04N 19/136* (2014.11); *H04N 19/137* (2014.11); *H04N 19/172* (2014.11); *H04N 19/44* (2014.11)

(58) Field of Classification Search
CPC ...................................................... H04N 7/183
See application file for complete search history.

(56) References Cited

U.S. PATENT DOCUMENTS 5,987,180 A    11/1999  Reitmeier
6,307,886 B1 *  10/2001  Westermann .......... H04N 19/51
                                                 375/240.09

(Continued)

FOREIGN PATENT DOCUMENTS

| EP | 0896466 A2 | 2/1999 |
|---|---|---|
| JP | 2009010612 A | 1/2009 |

OTHER PUBLICATIONS

Farin, Dirk et al. "A Software-Based High-Quality MPEG-2 Encoder Employing Scene Change Detection and Adaptive Quantization", International Conference on Consumer Electronics, 2001 Digest of Technical Papers, IEEE, pp. 148-149 (Jun. 19, 2001).
He, Yuwen et al. "Variable Frame-Rate Video Coding Based on Global Motion Analysis", Lecture Notes in Computer Science (LNCS) 2195, pp. 426-433 (2001).

(Continued)

Primary Examiner — James Pontius
(74) Attorney, Agent, or Firm — Volpe and Koenig, P.C.

(57) ABSTRACT

Input video frames are encoded into a sequence of output video frames arranged in groups of pictures (GOP). Each input video frame is encoded into an output video frame using a respective compression value. Each GOP in the sequence of output video frames has a GOP length defined by a number of frames contained in the GOP. A level of motion and a level of light in a first input video frame are determined. If level of light is below a predetermined threshold value, encode the first input video frame using a predetermined constant GOP length and a compression value which is a decreasing function of the level of light. If level of light is above, encode the first input video frame using a GOP length which is a decreasing function of the level of motion, and a compression value which is a decreasing function of the level of light.

18 Claims, 7 Drawing Sheets

(51) Int. Cl.
*H04N 19/137* (2014.01)
*H04N 19/107* (2014.01)
*H04N 19/44* (2014.01)

(56) References Cited

U.S. PATENT DOCUMENTS

| | | | |
|---|---|---|---|
| 6,731,685 B1* | 5/2004 | Liu | H04J 3/1688 348/385.1 |
| 6,959,044 B1 | 10/2005 | Jin et al. | |
| 9,402,114 B2* | 7/2016 | Gahm | H04N 21/8451 |
| 2001/0012324 A1 | 8/2001 | Normile | |
| 2011/0069757 A1 | 3/2011 | Ammu et al. | |
| 2011/0211633 A1 | 9/2011 | Valldosera et al. | |
| 2013/0077675 A1 | 3/2013 | Rosen et al. | |
| 2013/0342690 A1* | 12/2013 | Williams | H04N 5/232 348/143 |
| 2016/0277759 A1* | 9/2016 | Edpalm | G08B 25/08 |
| 2017/0244979 A1* | 8/2017 | Kumar | H04N 19/567 |

OTHER PUBLICATIONS

Kiewiet, N.G. et al. "Automated Surveillance and Detection of Foreign Stationary Objects", IEEE African 2011—The Falls Resort and Conference Centre, Livingstone, Zambia, pp. 1-6 (Sep. 13, 2011).

Lee, Jeehong et al. "Adaptive Intra-Frame Assignment and Bit-Rate Estimation for Variable GOP Length in H.264", IEEE Transactions on Circuits and Systems for Video Technology, vol. 16, No. 10, pp. 1271-1279 (Oct. 2006).

Yoneyama, Akio et al. "MPEG Encoding Algorithm with Scene Adaptive Dynamic GOP Structure", Multimedia Signal Processing, IEEE 3rd Workshop, Copenhagen, Denmark, pp. 297-302 (Sep. 13, 1999).

Zhang, Yang et al. "High dynamic range video compression by intensity dependent spatial quantization in HEVC", 2013 Picture Coding Symposium (PCS), IEEE, pp. 353-356 (Dec. 8, 2013).

"Reduce Bandwidth Consumption by GOP Settings"; Design & Spec Note; Video Quality, Recording & Storage, XP_55184683A_1; Published Nov. 20, 2009; pp. 1-5.

* cited by examiner

VIDEO ENCODING METHOD AND VIDEO ENCODER SYSTEM

CROSS REFERENCE TO RELATED APPLICATION

This application claims the benefit of European Patent Application No 14189913.8 filed on Oct. 22, 2014, which is incorporated by reference as if fully set forth.

FIELD OF INVENTION

The present invention relates to a method of encoding digital video data. Further, the present invention relates to a digital video encoder system for encoding video data.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels are encoded by exploiting the spatial redundancy of the pixels in a given channel of a single frame via prediction, transform, and entropy coding. The encoded frames are referred to as I-frames. The inter mode instead exploits the temporal redundancy between separate frames, and relies on a motion-compensation prediction technique that predicts parts of a frame from one or more previously decoded frames by encoding the motion in pixels from one frame to another for selected blocks of pixels. The encoded frames may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction.

At the site of reception of the encoded video sequence, the encoded frames are decoded. A concern in network camera monitoring systems is the available bandwidth for transmission of encoded video. This is particularly true in systems employing a large number of cameras. An analogous problem occurs regarding storage of images, for instance when storing images on an on-board SD card in the camera. A compromise has to be made, where available bandwidth is balanced against the interest of high quality images. A number of methods and systems have been used for controlling the encoding in order to reduce the bit rate of transmissions from the cameras. These known methods and systems generally apply a bit rate limit, and control the encoding such that the output bit rate from the cameras is always below the bit rate limit. In this way, it may be ensured that the available bandwidth is sufficient, such that all cameras in the system may transmit their video sequences to the site of reception, e.g., a control centre, where an operator may monitor video from the cameras of the system, and where video may be recorded for later use. However, applying a bit rate limit to all cameras may lead to undesirably low image quality at times, since the bit rate limit may require severe compression of images comprising a lot of details, regardless of what is happening in the monitored scene. For instance, it would be advantageous to get higher image quality when there is motion in the scene, e.g., in order to be able to identify an intruder, but a bit rate limit will instead lead to more severe compression, and thereby lower image quality, when there is motion in the captured scene.

SUMMARY

An object of the present invention is to provide a method of encoding digital video data and a digital video encoder system that improve on the abovementioned prior art.

A particular object of the present invention is to provide a method of encoding digital video data and a digital video encoder system that make it possible to limit an output bit rate to an available bandwidth, while still enabling delivery of high quality video of temporary movements in a captured scene.

According to a first aspect, the abovementioned objects are achieved, in full or at least in part, by a method of encoding digital video data corresponding to a sequence of input video frames, wherein said input video frames are encoded into a sequence of output video frames arranged in groups of pictures, each group of pictures comprising an intra-frame and zero or more subsequent inter-frames, each input video frame being encoded into an output video frame using a respective compression value, each group of pictures in said sequence of output video frames having a GOP length defined by a number of frames contained in the group of pictures.

The method including for a first input video frame determining a level of motion and a level of light in said input video frame, if said level of light is below a predetermined threshold value, encoding said first input video frame using a predetermined constant GOP length and a compression value which is a decreasing function of said level of light, if said level of light is above said predetermined threshold value, encoding said first input video frame using a GOP length which is a decreasing function of said level of motion, and a compression value which is a decreasing function of said level of light.

In this manner, when there is little light in the scene, the output bit rate may be reduced by fixing the GOP length and applying a high compression value. The resulting image quality reduction will generally be acceptable, since a dark scene in most cases cannot provide detailed information anyway. When there is motion, and the scene is light, such as during daytime outdoors or in a well-lit room, a higher bit rate may be allowed in order to provide more detailed information. This approach enables an effective use of bandwidth without applying any bit rate target or limit.

The level of light may be determined as at least one of a signal-to-noise ratio and a light intensity.

In a variant of the method, if said level of light is below said predetermined threshold value, a predetermined maximum compression value is used for encoding said first input video frame if said level of motion is a predetermined minimum level of motion. Hereby, it is possible to achieve a particularly low bit rate when the captured scene is dark, and there is little or no motion.

If said level of light is above said predetermined threshold value, a predetermined minimum compression value may be used for encoding said first input video frame if said level of light is a predetermined maximum level of light. In this way, high quality images may be provided when the captured scene is light, implying that there is little noise, and resulting in that images have potential to provide a high level of detail.

In a variant of the method, if said level of light is above said predetermined threshold value, a predetermined minimum GOP length is used for encoding said first input frame if said level of motion is a predetermined maximum level of motion. Thereby, a high quality video sequence may be provided when there is a high level of motion in the captured scene.

If said level of light is above said predetermined threshold value, a predetermined maximum GOP length may be used if said level of motion is a predetermined minimum level of motion. In this manner, a low bit rate may be achieved when there is little or no motion in the captured scene.

The method may further comprise encoding the sequence of input video frames at an output frame rate which is an increasing function of said level of motion. Hereby, a low bit rate may be achieved when there is little or no motion in the captured scene, and a smoother video sequence, providing more information may be provided when there is a high level of motion in the scene.

If a level of motion of a second input video frame differs from the level of motion of said first input video frame by a first threshold change amount, the method may further comprise changing the output frame rate by a predetermined frame rate amount. In this manner the level of motion in input video frames may be monitored, and when the level of motion changes, the frame rate may be adapted. For instance, if the camera is encoding and transmitting frames at a very low frame rate, such as 1 fps, because there is no motion in the captured scene, input video frames may be checked for motion more frequently than the frame rate at which frames are encoded and transmitted, and if motion is detected, the output frame rate may be increased instantly, even if less than 1 s has passed since the latest frame was encoded. Thus, a risk that motion in the scene is missed may be reduced.

The method may further comprise, for a second input video frame subsequent to said first input video frame, checking if the level of light has changed as compared to the first input video frame by a first threshold change amount. In this way, if the level of light in the scene is essentially the same as before, there is no need to recalculate the compression value, thereby making it possible to make the method particularly computationally efficient.

If the level of light has not changed as compared to the first input video frame by said threshold change amount, if a second level of motion of said second input video frame differs from the first level of motion of said first input video frame by a second threshold change amount said second input video frame may be encoded using a GOP length calculated based on said second level of motion. Thereby, the GOP length may be adapted to changing levels of motion even before a current group of pictures has been finished.

According to a second aspect, the abovementioned objects are achieved, in full or at least in part, by a digital video encoder system for encoding video data corresponding to a sequence of input video frames comprising: an encoder module being arranged to process input video frames into intra-frames or inter-frames arranged in groups of pictures, each group of pictures comprising an intra-frame and zero or more subsequent inter-frames; a light determination module being arranged to determine a level of light in input video frames; a motion determination module being arranged to determine a level of motion in input video frames; a compression value setting module being arranged to set a compression value to be used for encoding input video frames; a GOP length setting module being arranged to set a GOP length as a number of frames to be contained in a group of pictures; said GOP length setting module being arranged to set a predetermined constant GOP length if said level of light is below a predetermined threshold value; said compression value setting module being arranged to set a compression value which is a decreasing function of said level of light if said level of light is below a predetermined threshold value; said GOP length setting module being arranged to set a GOP length which is a decreasing function of said level of motion if said level of light is above said predetermined threshold value; and said compression value setting module being arranged to set a compression value which is a decreasing function of said level of light if said level of light is above said predetermined threshold value.

With such an encoder system, the output bit rate may be reduced by fixing the GOP length and applying a high compression value when there is little light in the scene. As already mentioned, the resulting image quality reduction will generally be acceptable, since a dark scene in most cases cannot provide detailed information anyway. When there is motion, and the scene is light, such as during daytime outdoors or in a well-lit room, a higher bit rate may be allowed in order to provide more detailed information. The inventive encoder system enables an effective use of bandwidth without applying any bit rate target or limit.

The digital video encoder system may further comprise a frame rate setting module being arranged to set a frame rate at which input video frames are encoded. Hereby, the encoder system may further control the output bit rate.

In an embodiment, said light determination module comprises a lux meter. A lux meter may provide a practical means of determining the level of light in input video frames.

The light determination module may be arranged to determine a signal-to-noise ratio in input video frames. This may also be a practical way of determining the level of light in the input video images, because images of a dark scene will generally contain more noise than images of a bright or well-lit scene.

According to a third aspect, the abovementioned objects are achieved, in full or at least in part, by a camera, comprising a digital video encoder system according to the second aspect.

According to a fourth aspect, the abovementioned objects are achieved, in full or at least in part, by a computer program product comprising a computer-readable storage medium with instructions adapted to carry out the method according to the first aspect when executed by a processor.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

The present invention is based on a number of principles that the inventor has realized are beneficial for reducing overall output bit rate, while enabling high quality images of scenes where there is motion.

One of these principles is that the GOP length used when encoding should be dependent on the level of motion in the frame to be encoded. Thus, when there is little or no motion, a long GOP length should be used, whereas when there is a high level of motion, a short GOP length should be used.

A second principle is that when there is little light in the scene, the GOP length should no longer vary in accordance with the level of motion. This is because when there is little light, there will be more noise in the image, i.e. the signal-to-noise ratio will be lower. Therefore, there is a risk that noise is interpreted as motion, giving rise to a high bit rate even for a scene where there is no actual motion. In order to deal with this, when the level of light is below a predetermined threshold value, a predetermined constant GOP length should be used instead.

A third principle is that a compression value used when encoding should be dependent on the level of light in the frame to be encoded. Thus, when there is little light in the scene, a high compression value should be used, whereas when there is much light, a low compression value should be used. In this way, high quality images may be provided when there is much light in the scene. When the captured scene is too dark to reveal useful information, the image quality will be lower, thereby reducing the output bit rate.

By applying these three principles when encoding digital video data, the output bit rate may be reduced overall while still providing high quality images when there is motion in the captured scene. The inventive method and system may be particularly useful in digital video systems employing a large number of systems, because generally, there will not be motion in the scenes captured by all cameras simultaneously. Thus, the available bandwidth may be used more effectively, since the output bit rate from cameras that at a given moment are capturing scenes without motion may be reduced, and cameras that at the same time are capturing scenes with motion may be allowed to use more of the available bandwidth.

A fourth principle, which may be applied in addition to the three afore-mentioned, is that the frame rate at which image frames are encoded should be dependent on the level of motion. Thus, when there is little or no motion, the frame rate should be low, whereas when there is a high level of motion, the frame rate should be high. This may add to the bit rate flexibility provided by the three first-mentioned principles, since cameras capturing scenes with little or no motion may transmit encoded image frames at a very low frame rate, thereby using only a small portion of the available bandwidth, whereas cameras capturing scenes with a higher level of motion may transmit encoded images at a higher frame rate, being allowed to use more of the available bandwidth.

Figure 1:
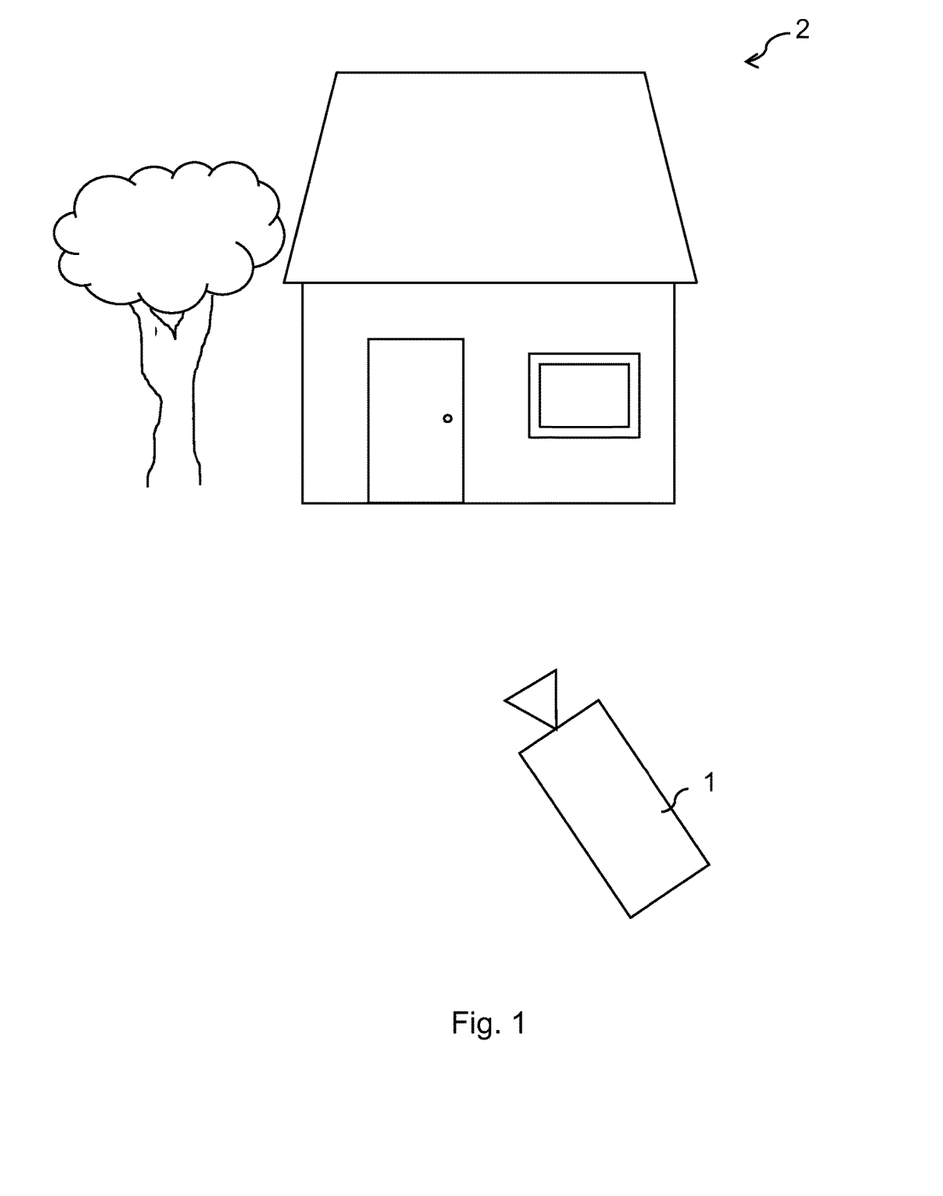
FIG. 1 is an illustration of a camera capturing a scene.
Figure 2:
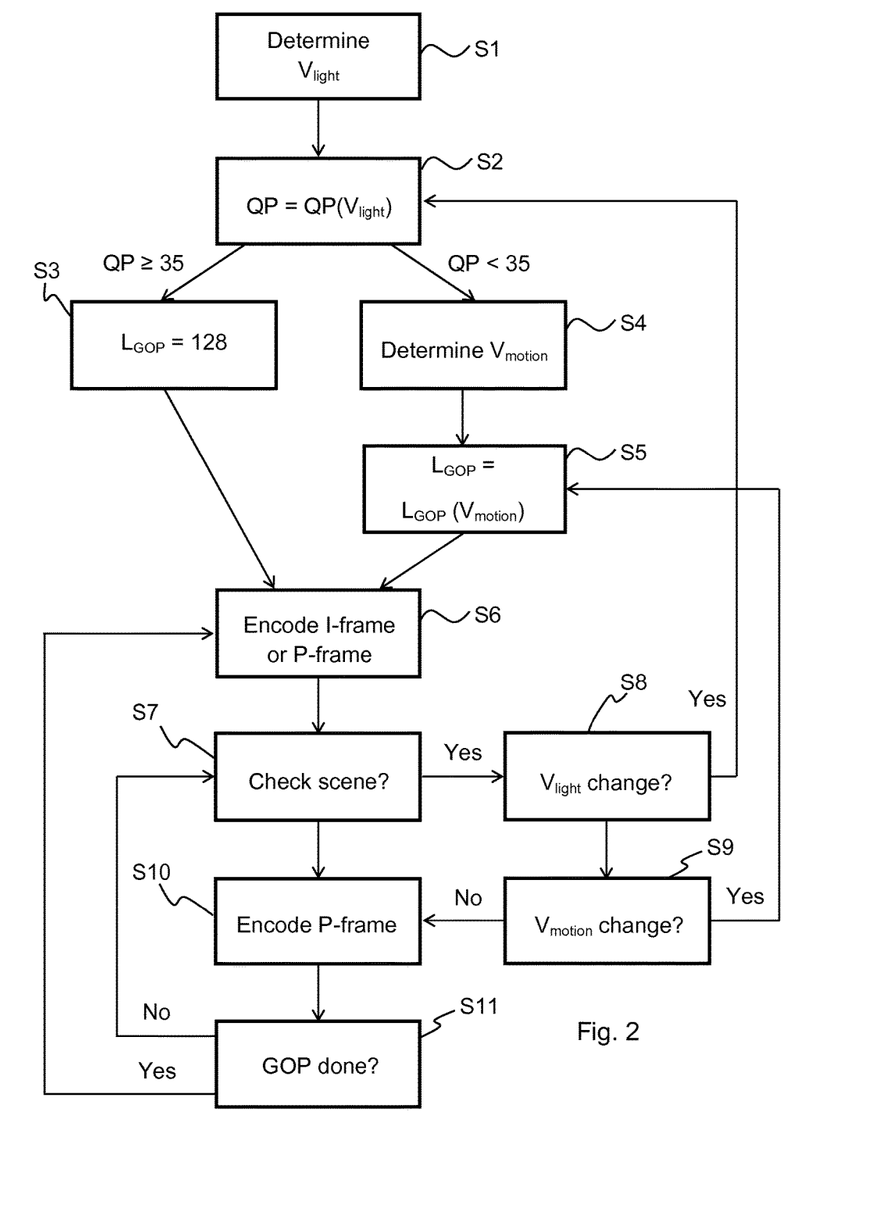
FIG. 2 is a flow diagram showing steps of a method of encoding digital video data according to a variant of the invention.

The invention will now be further described, by way of example, with reference first to FIG. 1, which shows a camera 1 capturing a scene 2. Turning to FIG. 2, when a first input image frame is to be encoded, in a first step S1 a level of light $V_{light}$ in the frame is determined. This may be done by determining a signal-to-noise ratio, by determining a light intensity in the scene, or both. The determination of light intensity may in turn be performed, e.g., using a lux meter integrated in or external to a housing of the camera. Alternatively, or additionally, the light intensity may be determined by extracting information from image data from the sensor capturing the scene. For instance, the sensor data may be converted into a YCbCr colour space, and the Y or luminance component may be used as the light intensity.

Next, in step S2, a compression value QP is calculated as a function of the level of light $V_{light}$. The compression value QP may for instance be the quantisation parameter used in the H.264 compression format. The compression value QP is calculated as a decreasing function of the level of light $V_{light}$. Thus, if the level of light $V_{light}$ is high, meaning that the captured scene is light, the compression value QP will be low, such that the first image is not heavily compressed, but may provide a high level of detail. If, on the other hand, the level of light $V_{light}$ is low, meaning that the captured scene is dark, the compression value QP will be high, such that the first image is more heavily compressed, thereby reducing the output bit rate at the cost of lowering the quality of the output image. This trade-off will generally be acceptable, since a dark scene will generally not provide much information.

If the calculated compression value QP is more than or equal to a predetermined value, indicating that the level of light is below or equal to a predetermined threshold value, the GOP length, i.e. the length of a group of pictures to be encoded, is set to a predetermined constant value. As examples, the predetermined value of the compression value QP may be 35, on a scale where QP=0 signifies a minimal compression and QP=50 signifies a maximum compression, and the predetermined constant value of the GOP length may be 128, meaning that there are one intra-frame and 127 subsequent inter-frames in the group of pictures. In this example, the longest permissible GOP length is 255, and the shortest permissible GOP length is 1, meaning that only intra-frames are encoded.

If, on the other hand, the calculated compression value QP is below the predetermined threshold value, in step S4 a level of motion $V_{motion}$ in the first image frame is determined. The level of motion may be determined by determining pixel differences between the current image frame and one or more previous image frames, and taking the number of changed pixels as a measure of the level of motion. Alternatively, more complex motion detection algorithms, known per se, may be used.

In step S5, the GOP length $L_{GOP}$ to be used when encoding is calculated as a decreasing function of the level of motion $V_{motion}$. Thus, if the level of motion $V_{motion}$ is low, the GOP length $L_{GOP}$ will be long, meaning that there are many inter-frames between intra-frames, and if the level of motion $V_{motion}$ is high, the GOP length $L_{GOP}$ will be short, meaning that there are few or even no inter-frames between intra-frames.

Then, when the GOP length $L_{GOP}$ has been set, either as a constant value because the captured scene is dark, or as a function of the level of motion if the scene is light, the first image is encoded as an intra-frame in step S6.

For the next input image frame, i.e. a second input image frame, it is determined if the scene should be checked for changes. The method may be set to check for changes for each input image frame, or may be set to check less frequently, e.g., every two or four input image frames. This frequency may be adjustable by a user, or may be pre-set.

If the scene is to be checked for the second input image frame, it is determined in step S8 whether the level of light $V_{light}$ has changed by more than a threshold change amount. If this is answered in the positive, a new compression value QP is calculated as a decreasing function of the level of light $V_{light}$ by returning to step S2.

However, if the level of light $V_{light}$ has not changed, there is no need to calculate a new compression value QP. The method then proceeds to step S9 where it is determined whether the level of motion $V_{motion}$ has changed by more than a predetermined threshold change amount. If this is answered in the positive, a new GOP length $L_{GOP}$ is calculated as a decreasing function of the level of motion $V_{motion}$ by returning to step S5.

If the level of motion $V_{motion}$ has not changed, in step S10 the second input image frame is encoded as an inter-frame.

In step S11, it is checked if the current group of pictures has been completed, by comparing the current value of the GOP length $L_{GOP}$ to the number of pictures encoded in the current group of pictures. If the end of the group of pictures has not yet been reached, the method returns to step S7 and determines if the scene should be checked for changes. If, on the other hand, the group of pictures is completed, the method returns to step S6 to encode a third input image frame as an intra-frame using the current values of the compression value QP and the GOP length $L_{GOP}$.

Figure 3:
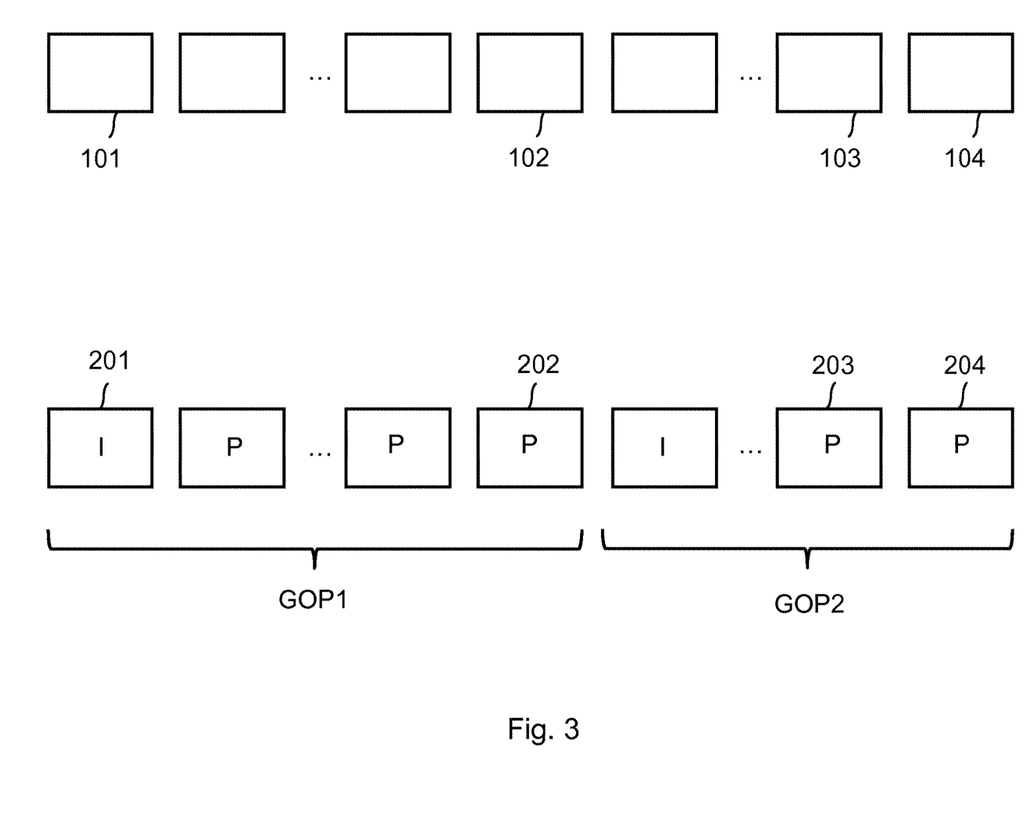
FIG. 3 is an illustration of a video sequence encoded according to a variant of the invention.

FIG. 3 shows an example of a video sequence of input image frames (top row of FIG. 3), and a video sequence of corresponding encoded output image frames (bottom row of FIG. 3). A number of examples will now be given, in order to further illustrate the inventive method. In these examples, the level of light $V_{light}$ is measured on a scale of 0 to 10, where 0 signifies a very dark scene, and 10 signifies a very bright scene. The level of motion is also measured on a scale of 0 to 10, where 0 signifies no motion, and 10 signifies a lot of motion. The minimum GOP length $L_{GOP, min}$ used will be 32, and the maximum GOP length $L_{GOP, max}$ will be 255. The constant GOP length $L_{GOP, const}$ is in these examples set to 128. This constant GOP length will be used if the level of light is below a predetermined threshold value $V_{light, th}$. In these examples, the threshold value $V_{light, th}$ will be 3. The compression values QP will be the quantisation parameter used in the H.264 format. The minimum compression value $QP_{min}$ used will be 20, and the maximum compression value $QP_{max}$ will be 43.

Example 1

$V_{light}=V_{light, min}=0$ $V_{motion}=V_{motion, min}=0$

In this input image frame, marked with the reference number 101 in FIG. 3, the level of light is at a minimum, meaning that the captured scene is considered completely dark or dark enough not to convey detailed information. Further, there is no motion in the scene. Using the principles illustrated in FIG. 2, the following values are then calculated for the current input image frame 101:

$QP=QP_{max}=43$ $L_{GOP}=L_{GOP, const}=128$

Since the level of light $V_{light}$ is below the threshold value $V_{light, th}$, the GOP length is not varied depending on the level of motion, but will be set to the constant value $L_{GOP, const}$. It may be noted that in FIG. 2, the deciding factor used is if the compression value QP is below or above 35. However, since the compression value QP is calculated as a decreasing function of the level of light $V_{light}$, this corresponds to the level of light $V_{light}$ being above or below 3, respectively. Thus, it does not matter if the level of light $V_{light}$ is checked, or if the compression value QP calculated as a function of the level of light $V_{light}$ is checked in order to determine how to establish the GOP length. The input image frame 101 is encoded into an output image frame 201 using these values. The output frame 201 is to be the first in a first group of pictures GOP1, and the current input image frame 101 is therefore encoded as an I-frame. Otherwise, it would be encoded as a P-frame.

Example 2

$V_{light}=5$ $V_{motion}=V_{motion, min}=0$

In this input frame, referenced 102 in FIG. 3, there is more light, but there is still no motion. Based on these determinations, the following values are calculated:

$QP=27$ $L_{GOP}=L_{GOP, max}=255$

Here, the level of light is above the threshold value $V_{light, th}$, and therefore the GOP length is calculated as a function of the level of motion $V_{motion}$. These calculated values are then used for encoding the second input image frame 102 into a second output image frame 202. This output image frame 202 is to be the last in the first group of pictures GOP1, and the second input image frame 102 is therefore encoded as a P-frame.

Example 3

$V_{light}=5$ $V_{motion}=5$

In this image frame, referenced 103 in FIG. 3, the level of light $V_{light}$ is the same as in Example 2, but now, there is some motion in the scene. Based on the current level of light and level of motion, the following values are calculated:

$QP=27$ $L_{GOP}=64$

The calculated compression value QP and GOP length $L_{GOP}$ are used when encoding the third input image frame 103 into a third output image frame 203. This output image frame is to be located somewhere along a second group of pictures GOP2, and the third input image frame 103 is therefore encoded as a P-frame.

Example 4

$$V_{light} = V_{light, max} = 10$$

$$V_{motion} = V_{motion, max} = 10$$

In this example, the input image frame denoted 104 has a maximum level of light, and a maximum level of motion. Based on these determinations, the following values are calculated:

$$QP = QP_{min} = 20$$

$$L_{GOP} = L_{GOP, min} = 32$$

These values are used for encoding the fourth input image frame 104 into a fourth output image frame 204. The output image frame 204 is to be the last of the second group of pictures GOP2, and therefore the fourth input image frame 104 is encoded using inter mode, into a P-frame.

Figure 4:
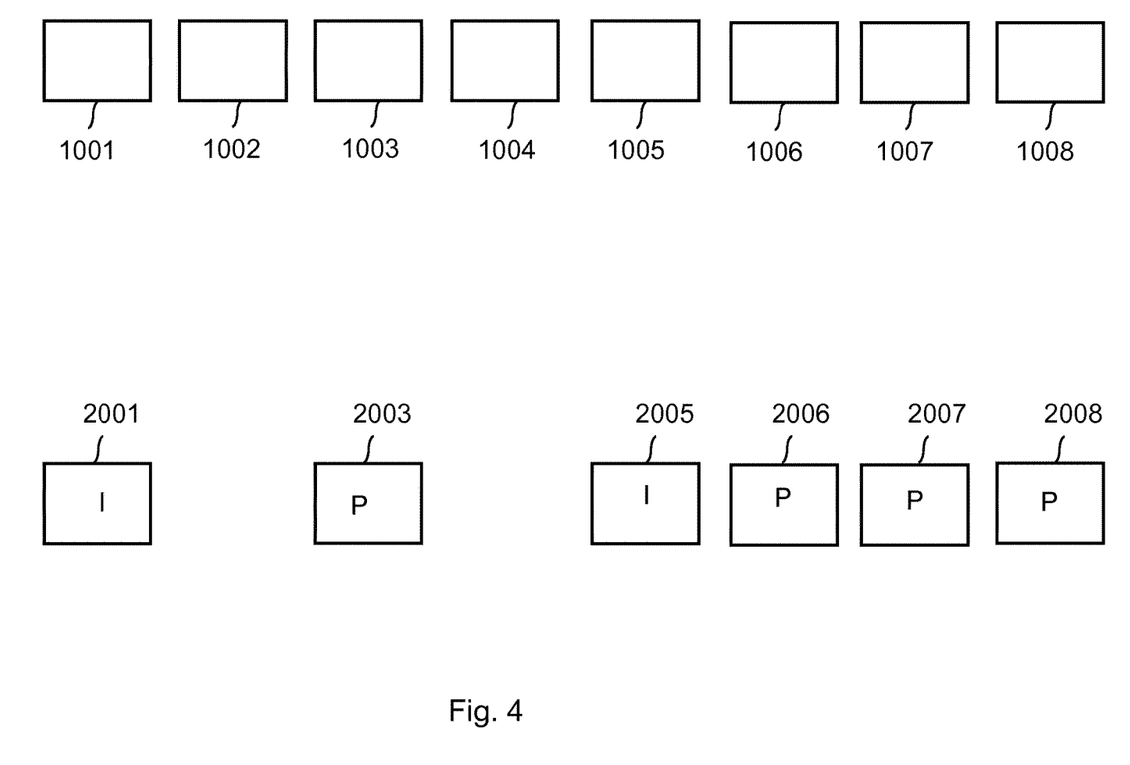
FIG. 4 is an illustration of another video sequence encoded according to a variant of the invention.

Turning now to FIG. 4, another example will be given in order to explain the use of varying frame rate. FIG. 4 depicts a video sequence of input image frames (top row of FIG. 4), and a video sequence of encoded output image frames (bottom row of FIG. 4).

Example 5

In this example, the principle of controlling the output frame rate dependent on the level of motion is used in addition to the principles already discussed in connection with FIG. 2 and the examples above. When the first image frame 1001 is to be encoded, the level of motion and the level of light are determined, and a compression value and GOP length to be used are established based thereon. However, the level of motion is also used for determining an output frame rate at which image frames are to be encoded. In this image frame 1001, there is a first level of motion, and the output frame rate is set to a first output frame rate. The first output frame rate is lower than an input frame rate at which images are captured by the sensor of the camera 1. In this example, the input frame rate is 30 fps, and the first output frame rate is 15 fps. The first input image frame 1001 is encoded as an I-frame 2001.

When the next input image frame 1002 is captured, the level of motion in that image frame 1002 is determined. This second level of motion is essentially the same as the first level of motion, i.e. the level of motion has not changed by more than a threshold change amount from the first input image frame 1001 to the second input image frame 1002. Therefore, the output frame rate at which image frames are encoded is not altered. Since the input frame rate is twice as high as the first output frame rate this second input image frame is not encoded.

When the third input image frame 1003 is captured, the level of motion and the level of light are determined, and the compression value and GOP length to be used for encoding are established. The level of motion remains generally equal to the first level of motion, and therefore the output frame rate is kept the same as for the previous image frames. The third input image frame is encoded as a P-frame 2003.

For the fourth input image frame 1004, the level of motion is once more determined, and has not changed by more than a threshold change amount as compared to the previous input image frame 1003. Thus, the output frame rate is maintained, and the fourth input image frame 1004 is not encoded.

When the fifth input image frame 1005 has been captured, the level of motion and the level of light are determined as a fifth level of motion and a fifth level of light. This fifth level of motion is higher than the level of motion in the previous input image frames, and has increased by more than a threshold change amount as compared to the previous frames. Therefore, a fifth output frame rate at which images are to be encoded is established. In this example, the fifth output frame rate is equal to the input frame rate, namely 30 fps. Further, the fifth level of motion is such that the fifth GOP length is shorter than the GOP length used for the previous image frames, such that a new group of pictures is to be commenced. The fifth input image frame 1005 is therefore encoded as an I-frame 2005.

For the following input image frames 1006, 1007, and 1008 the same procedure is used. Here, the level of motion does not decrease, and the fifth output frame rate is therefore kept. It should here be noted that even if the level of motion should increase further, the output frame rate cannot be increased, since it is now already equal to the input frame rate. Until the end of the current group of pictures, the input image frames 1006, 1007, and 1008 are encoded as P-frames 2006, 2007, and 2008.

Figure 5A:
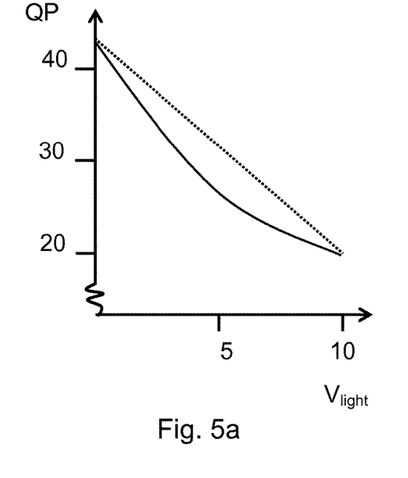
FIGS. 5a-c are graphs showing examples of how compression value and GOP length may vary dependent on level of light and level of motion.
Figure 5B:
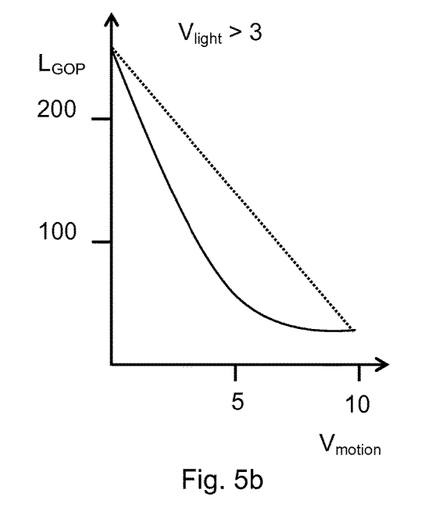
Figure 5C:
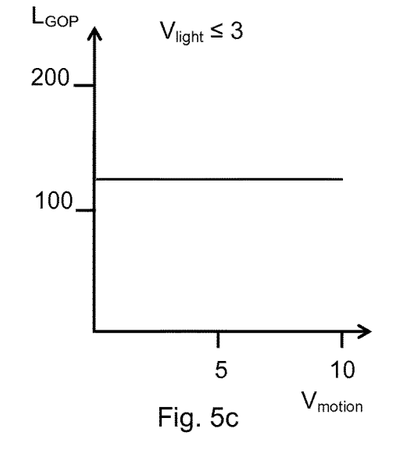

Reference will now be made to FIGS. 5a, 5b, and 5c, showing graphs of how the compression value may be varied dependent on the level of light (FIG. 5a), and how the GOP length may be varied dependent on the level of motion (FIGS. 5b and 5c). The compression value QP is determined as a decreasing function of the level of light in the image frame to be encoded. The dependency may follow a linear function, marked with dotted line in FIG. 5a. However, in the examples above, the dependency follows a slightly different function, marked with solid line in FIG. 5a. As may be seen here, at a minimum level of light $V_{light, min}$, the compression value QP takes a maximum value $QP_{max}$, and at a maximum level of light $V_{light, max}$ the compression value QP takes a minimum value $QP_{min}$.

In FIG. 5b the GOP length $L_{GOP}$ is shown as a function of the level of motion $V_{motion}$ for an input image frame in which the level of light $V_{light}$ is above the predetermined threshold value. As in the examples described above, this threshold value is 3. Similar to what was discussed in connection with FIG. 5a, the relation between the level of light $V_{light}$ and the GOP length $L_{GOP}$ may be linear (dotted line), but in the examples given above, the function deviates slightly from the linear (solid line). As shown in either case, the GOP length $L_{GOP}$ takes a maximum value $L_{GOP, max}$ for a minimum level of motion $V_{motion, min}$. For a maximum level of motion $V_{motion, max}$, the GOP length $L_{GOP}$ takes a minimum value $L_{GOP, min}$.

Turning now to FIG. 5c, this graph shows the relation between the level of light $V_{light}$ and the GOP length for an input image frame in which the level of light $V_{light}$ is below or equal to the predetermined threshold value of 3. For such dark image frames, a constant GOP length $L_{GOP, const}$ is used, regardless of what the level of motion is.

Figure 6:
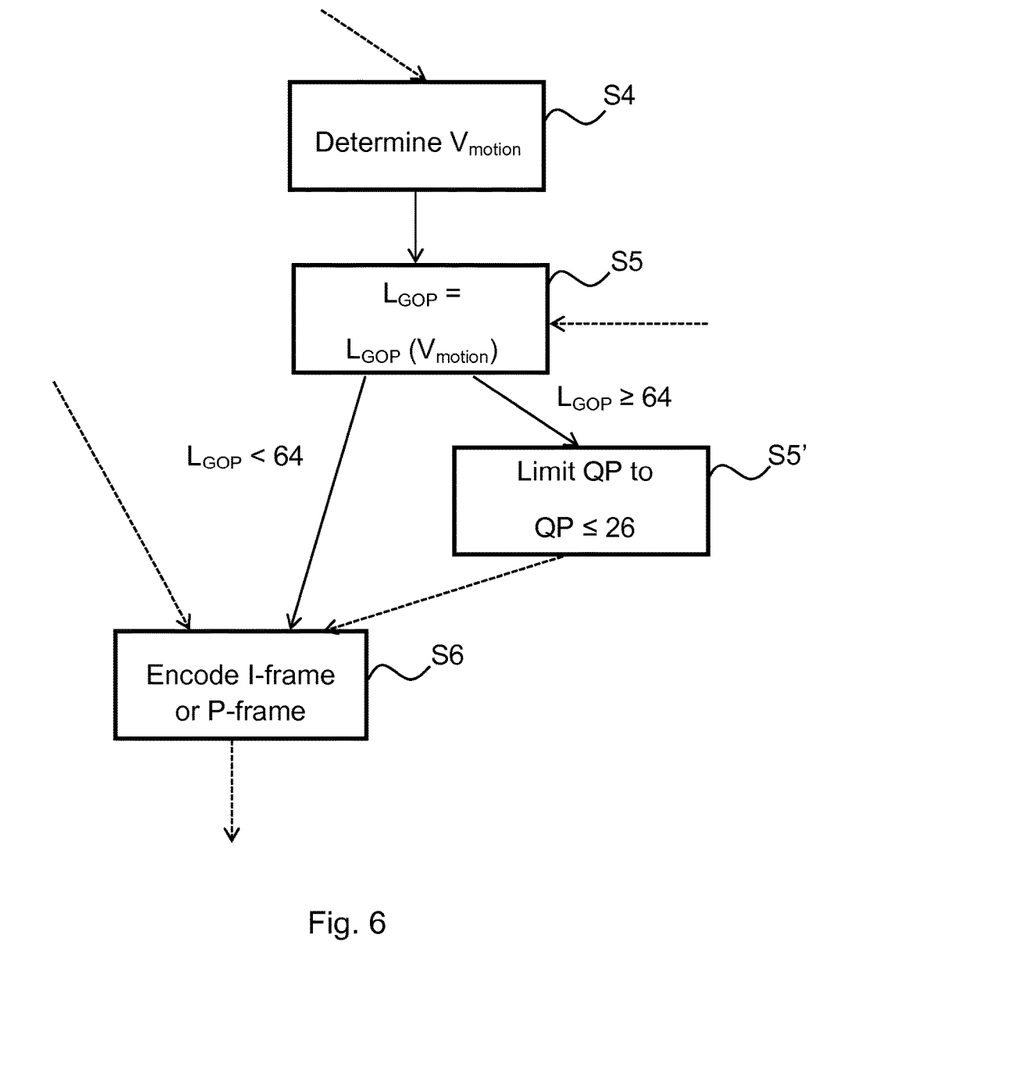
FIG. 6 is a flow diagram showing additional steps according to another variant of the invention.

With reference to FIG. 6, a variant of the above-described method will now be described. Using this variant of the method, further bit rate savings may be achieved for images with good light conditions, but little motion. Part of the flow diagram shown in FIG. 2 is shown here, namely steps S4, S5, and S6. The preceding and subsequent steps of FIG. 2 remain unchanged and are therefore not shown and discussed here. In the variant shown in FIG. 6, an additional step S5' is added if the GOP length $L_{GOP}$ set in step S5 is equal to or above 64. This implies that there is little motion in the scene. In order to reduce the output bit rate, a limit is used for the compression values. Thus, if the previously calculated compression value QP is above 26, the compression value QP is reset to 26. Since there is little motion in the scene, the ensuing image quality reduction will generally be acceptable to the viewer. If the previously calculated compression value is below 26 it is not changed. When the compression value QP has been lowered or maintained in step S5', the method proceeds to encode the image frame in step S6. If the GOP length $L_{GOP}$ calculated in step S5 is below 64, the method proceeds to encode the image frame in step S6 without applying any compression value cap.

Figure 7:
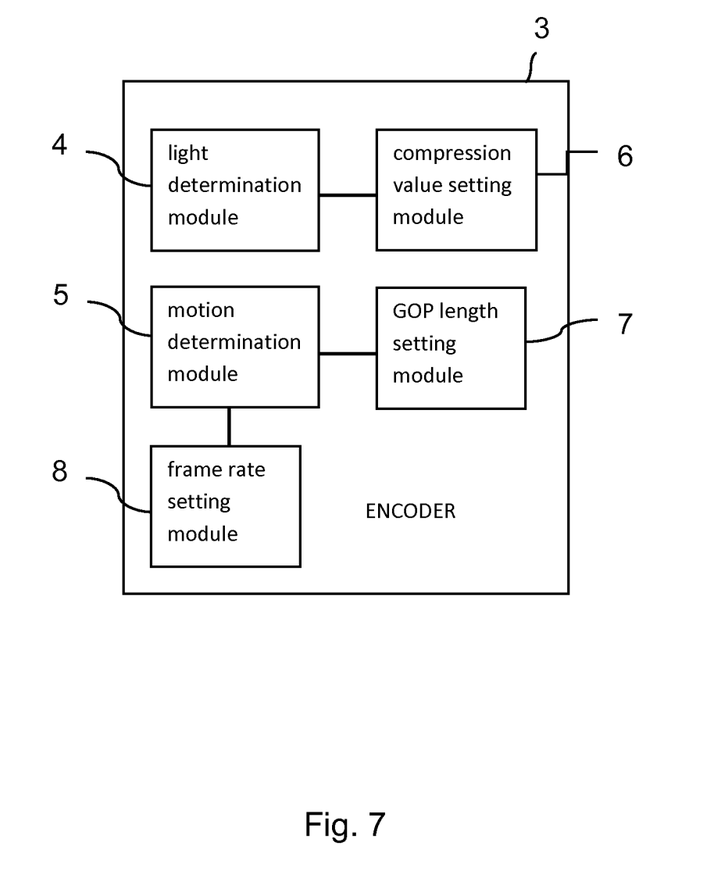
FIG. 7 is a representation of a digital video encoder system according to an embodiment of the invention.

FIG. 7 is a schematic drawing of a digital video encoder system 3, which may be used for encoding digital video data in accordance with the methods described above. Thus, the encoder system has a light determination module 4, which is arranged to determine a level of light $V_{light}$ in input image frames, and a motion determination module 5, which is arranged to determine a level of motion $V_{motion}$ in input image frames. The encoder system 3 further comprises a compression value setting module 6, which is arranged to set a compression value QP to be used for encoding input image frames. The encoder system 3 also comprises a GOP length setting module 7, which is arranged to set a GOP length $L_{GOP}$ as a number of frames to be contained in a group of pictures when encoding input image frames. The GOP length setting module 7 is arranged to set a predetermined constant GOP length $L_{GOP, const}$ if the level of light $V_{light}$ is below a predetermined threshold value $V_{light, th}$. Further, the GOP length setting module 7 is arranged to set a GOP length $L_{GOP}$ which is a decreasing function of the level of motion if the level of light $V_{light}$ is above the predetermined threshold value $V_{light, th}$. The compression value setting module 6 is arranged to set a compression value QP which is a decreasing function of the level of light.

The encoder system 3 further comprises a frame rate setting module 8, which is arranged to set a frame rate at which input image frames are to be encoded. The frame rate setting module 8 is arranged to set the frame rate as an increasing function of the level of motion $V_{motion}$.

The encoder system 3 may be integrated in the camera 1, or may be embodied as a separate unit operatively connected to the camera 1.

The light determination module 4 may comprise a lux meter, which may be arranged in a housing of the camera 1, or may be separate from the camera 1. Alternatively, or additionally, the light determination module 4 may use image data from the sensor of the camera 1 for determining the light intensity in input image frames.

The operation of the encoder system 3 may generally be in accordance with the encoding method described in connection with FIGS. 2-5.

The encoder system 3 may be embodied as hardware, firmware, or software, or as a combination thereof. The invention may be embodied in the form of a computer program product comprising a computer-readable storage medium with instructions adapted to carry out the method of the invention when executed by a processor.

It will be appreciated that a person skilled in the art can modify the above described embodiments in many ways and still use the advantages of the invention as shown in the embodiments above. As an example, the invention is applicable to various compression formats, such as MPEG and H.264. It is generally applicable to all compression formats that use intra-frames and inter-frames.

In the embodiments described above, the inter-frames used are only P-frames. However, the invention may also be used with B-frames.

The compression values used in the examples above have been the quantisation parameter used in the H.264 format. However, the compression value may take other forms. For instance, the compression value may be given as a percentage of a predetermined maximum compression, thus ranging from 0 to 100%.

Further, default values may be pre-set for the GOP length and the compression value to be used when encoding is started. After the first image frame has been encoded, the GOP length and the compression value are set in accordance with the method described above. Alternatively, the GOP length and compression values may be set based on level of light and level of motion already at start-up of the encoding.

In the description above, example values of the minimum, maximum and constant GOP length have been mentioned, as well as example values of the maximum and minimum compression values. However, other values may be used. These may be pre-set in the encoding method or encoder system, or they may be input by a user. The values may be chosen depending on the particular chip in the camera, on the purpose of the transmitted images, and on the available bandwidth. For instance, for one chip compression values QP of 15-38 as used in the H.264 format have been found advantageous, whereas for another chip compression values of 20-40 are preferred.

Similarly, an example of the threshold value for the level of light has been mentioned, but other values may be used for this threshold. This may also be pre-set or configurable by the user.

Other frame rates than the ones discussed above are also possible.

The level of light and the level of motion may be determined using other measuring scales.

The inventive method and system are particularly useful for systems employing many cameras. However, they may be used to advantage also in systems employing only a few cameras.

The invention may be used with all kinds of digital video cameras, e.g., cameras employing visible light, IR cameras, or thermal cameras. It may also be used in a video encoder that is arranged to be connected to an analogue camera.

Thus, the invention should not be limited to the shown embodiments but should only be defined by the appended claims.

What is claimed is:

1. A method of compressing digital video data that enhances utilization of available bandwidth for transmission of compressed video, the method comprising:
   receiving a sequence of input video frames; and
   encoding the sequence of input video frames into a sequence of output video frames arranged in groups of pictures, wherein each group of pictures comprising an intra-frame and zero or more subsequent inter-frames and have a GOP length defined by a number of frames contained in the group of pictures,
   wherein the encoding the sequence of input video frames includes:
   determining, for a first input video frame from the sequence of input video frames, a level of motion and a level of light of the first input video frame;
   on a condition that the level of light is below or equal to a predetermined threshold value, encoding the first input video frame to form an output video frame using a predetermined constant GOP length and a first compression value that is a decreasing function of the level of light;

on a condition that the level of light is above the predetermined threshold value, encoding the first input video frame to form the output video frame using a calculated GOP length that is a decreasing function of the level of motion, and a second compression value that is a decreasing function of the level of light.

2. The method according to claim 1, wherein on a condition that the level of light is below the predetermined threshold value, a predetermined maximum compression value is used for encoding the first input video frame on a condition that the level of motion is a predetermined minimum level of motion.

3. The method according to claim 2, wherein on a condition that the level of light is above the predetermined threshold value, a predetermined minimum compression value is used for encoding the first input video frame if the level of light is a predetermined maximum level of light.

4. The method according to claim 1, wherein on a condition that the level of light is above the predetermined threshold value, a predetermined minimum GOP length is used for encoding the first input frame if the level of motion is a predetermined maximum level of motion.

5. The method according to claim 1, wherein on a condition that the level of light is above the predetermined threshold value, a predetermined maximum GOP length is used if the level of motion is a predetermined minimum level of motion.

6. The method according to claim 1, wherein the encoding further includes encoding the sequence of input video frames at an output frame rate which is an increasing function of the level of motion.

7. The method according to claim 6, wherein the encoding further includes:

determining, for a second input video frame from the sequence of input video frames, a level of motion of the second input video frame on a condition that the level of motion of the second input video frame differs from the level of motion of the first input video frame by a first threshold change amount, changing the output frame rate by a predetermined frame rate amount.

8. The method according to claim 1, wherein the encoding further includes:

for a second input video frame subsequent to the first input video frame checking if the level of light has changed as compared to the first input video frame by a first threshold change amount.

9. The method according to claim 8, wherein if the level of light has not changed as compared to the first input video frame by the threshold change amount, if a second level of motion of the second input video frame differs from the level of motion of the first input video frame by a second threshold change amount encoding the second input video frame using a GOP length calculated based on the second level of motion.

10. The method according to claim 1, wherein if the level of light is above the predetermined threshold value, a predetermined minimum compression value is used for encoding the first input video frame if the level of light is a predetermined maximum level of light.

11. A computer program product comprising a non-transitory computer-readable storage medium with instructions adapted to carry out the method of claim 1 when executed by a processor.

12. A digital video encoder system for compressing video data that enhances utilization of available bandwidth for transmission of compressed video, the digital video encoder comprising:

an input that receives a sequence of input video frames;

an output that transmits a sequence of output video frames arranged in groups of pictures, wherein each group of pictures comprising an intra-frame and zero or more subsequent inter-frames and have a GOP length defined by a number of frames contained in the group of pictures; and a processor communicatively coupled to the input and the output;

wherein the processor encodes the sequence of input video frames into the sequence of output video frames by:

determining a level of light in a first input video frame from the sequence of input video frames, determining a level of motion in the first input video frame, setting a compression value, wherein the compression value is set to a decreasing function of the level of light, and setting a GOP length as a number of frames to be contained in a group of pictures based on the light level, wherein the GOP length is set a predetermined constant GOP length when the level of light is below or equal to a predetermined threshold value and the GOP length is set to a decreasing function of the level of motion when the level of light is above the predetermined threshold value.

13. The digital video encoder system according to claim 12, wherein the processor further sets a frame rate at which input video frames are encoded.

14. The digital video encoder system according to claim 13, further comprising a lux meter that is communicatively coupled to the processor.

15. The digital video encoder system according to claim 13, wherein the processor further determines a signal-to-noise ratio in input video frames.

16. The digital video encoder system according to claim 12, further comprising a lux meter that is communicatively coupled to the processor.

17. The digital video encoder system according to claim 12, wherein the processor further determine a signal-to-noise ratio in input video frames.

18. A camera, comprising a digital video encoder system according to claim 12.

* * * * *